US008798528B2

(12) United States Patent
Wang et al.

(10) Patent No.: US 8,798,528 B2
(45) Date of Patent: Aug. 5, 2014

(54) MULTI-HOP WIRELESS COMMUNICATION SYSTEM AND RELAY METHOD AND RELAY STATION THEREIN

(75) Inventors: Xinglin Wang, Beijing (CN); Yi Sheng Xue, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 609 days.

(21) Appl. No.: 13/120,016

(22) PCT Filed: Sep. 15, 2009

(86) PCT No.: PCT/EP2009/061963
§ 371 (c)(1),
(2), (4) Date: Apr. 20, 2011

(87) PCT Pub. No.: WO2010/034655
PCT Pub. Date: Apr. 1, 2010

(65) Prior Publication Data
US 2011/0189944 A1    Aug. 4, 2011

(30) Foreign Application Priority Data
Sep. 26, 2008   (CN) .......................... 2008 1 0166914

(51) Int. Cl.
H04B 7/185    (2006.01)
(52) U.S. Cl.
USPC ...................................... 455/13.1; 455/456.2
(58) Field of Classification Search
CPC ... H04W 88/04; H04W 52/241; H04W 52/48; H04W 72/08
USPC ................... 455/11.1, 13.1, 15, 16
See application file for complete search history.

(56) References Cited

U.S. PATENT DOCUMENTS

| 7,139,527 B2 * | 11/2006 | Tamaki et al. ............. 455/16 |
| 7,720,020 B2 * | 5/2010 | Larsson .................... 370/315 |
| 2005/0272366 A1 | 12/2005 | Eichinger et al. ........... 455/9 |
| 2008/0219214 A1 | 9/2008 | Chen et al. ................. 370/331 |

FOREIGN PATENT DOCUMENTS

| EP | 1947895 A1 | 7/2008 | ............... H04Q 7/38 |
| WO | 2008/024158 A1 | 2/2008 | ............... H04L 1/18 |
| WO | 2008/049889 A1 | 5/2008 | ............... H04Q 7/32 |

OTHER PUBLICATIONS

Baum, K. et al., "Transparent Uplink Relaying for OFDMA", Motorola Labs, Schaumburg, IL; XP002419889, www.ieee802.org/16/tge/contrib/, 9 pages, Feb. 13, 2007.
International PCT Search Report and Written Opinion, PCT/EP2009/061963, 16 pages, Jan. 22, 2010.

* cited by examiner

Primary Examiner — Tu X Nguyen
(74) Attorney, Agent, or Firm — King & Spalding L.L.P.

(57) ABSTRACT

A relay station, which is originally deployed in the multi-hop wireless communication system and used for relaying the communication between a base station and a mobile station, is referred to as an ordinary relay station, and a relay station is referred to as an aid relay station. The aid relay station can decide whether to provide aid to the ordinary relay station, and can be invisible to the base station and the mobile station, namely, the aid relay station will not generate signaling between itself and the base station or the mobile station, and therefore the aid relay station, when being implemented, will not generate extra signaling overheads in the multi-hop wireless communication system; and at the same time, when the relay quality of an aided relay station is poor, it can be improved by the aid relay station, thereby improving the system performance of the multi-hop wireless communication system.

18 Claims, 2 Drawing Sheets

MULTI-HOP WIRELESS COMMUNICATION SYSTEM AND RELAY METHOD AND RELAY STATION THEREIN

CROSS-REFERENCE TO RELATED APPLICATIONS

This application is a U.S. National Stage Application of International Application No. PCT/EP2009/061963 filed Sep. 15, 2009, which designates the United States of America, and claims priority to Chinese Application No. 200810166914.X filed Sep. 26, 2008. The contents of which are hereby incorporated by reference in their entirety.

TECHNICAL FIELD

The present invention relates to wireless communication technology and, in particular, to a multi-hop wireless communication system and a relay method and a relay station in the system.

BACKGROUND

Currently, multi-hop wireless communication technology is one of the research and development hot spots in the field of wireless communication technology, and the multi-hop wireless communication systems represent a development trend for future wireless communication systems. For example, the Institute of Electrical and Electronics Engineers (IEEE) has established a Relay Task Group, to engage in the introduction of the concept of a relay station in a wireless communication system that is based on the standards of IEEE 802.16 series.

A strong advantage of the multi-hop wireless communication system is the adoption of relay stations. By the adoption of relay stations, the coverage of a base station in a conventional wireless cellular communication system can be significantly extended, and at the same time, a more flexible path selection can be provided for the communication between a base station and mobile stations. In this way, in a region where the coverage of a base station of a conventional cell is poor, or when the communication link between a base station and a mobile station is affected by shadow fading, by using a relay station to relay the communication between the base station and mobile station so as to change an originally single and fixed "single-hop" link between the base station and the mobile station into a "multi-hop" link that can be selected flexibly, the performance of the wireless cellular communication system can be improved significantly. Theoretically speaking, it can be simply considered that, when the number of relay stations in a multi-hop wireless communication system increases, the performance of this system will be greatly improved, as there are more communication paths for selection.

However, when the number of relay stations in the multi-hop wireless communication system increases continuously, a problem occurs at the same time in which the system overheads for managing these relay stations also increase continuously. In a multi-hop wireless communication system where the relay stations are managed in a centralized manner, both the communication link between abase station and a relay station and the communication link between a relay station and a mobile station need to be managed by the base station, and with the continuous increase in the number of relay stations, the signaling overheads for the link management in the base station will increase significantly, especially in the case of supporting the cooperative relay, the increase of the signaling overheads will be very significant.

For this reason, the concept of a distributed network is proposed in the multi-hop wireless communication system. The difference between this distributed network and the centralized management mentioned above is that, on the basis of the concept of a distributed network, a base station only manages the communication link between itself and the relay stations, while the communication link between a relay station and a mobile station is managed by the relay station itself. Although the distributed link management can reduce a part of signaling overheads for the link management by the base station, the base station still has to manage the communication link between itself and the relay stations, and therefore, when the number of relay stations increases, the increase of signaling overheads for the link management is inevitable.

SUMMARY

In view of the situation, according to various embodiments, a relay method in a multi-hop wireless communication system, and a multi-hop wireless communication system and a relay station using the method can be provided, thereby reducing the signaling overheads for managing the relay stations in the multi-hop wireless communication system.

According to an embodiment, a relay method in a multi-hop wireless communication system, wherein a base station communicates with a mobile station via a relay station 1; may comprise:

acquiring by a relay station 2 downlink wireless resource allocation information between said base station and said relay station 1 and between said relay station 1 and said mobile station, and/or uplink wireless resource allocation information between said mobile station and said relay station 1 and between said relay station 1 and said base station;

wherein when said relay station 2 decides to aid the downlink relay of said relay station 1, according to the downlink wireless resource allocation information acquired by it, said relay station 2 forwards the relay data received by it, and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by it, said relay station 2 forwards the relay data received by it, and sent by said mobile station to said relay station 1, to said base station by using the uplink wireless resource allocated between said relay station 1 and said base station.

According to a further embodiment, said relay station 2 may acquire said downlink wireless resource allocation information and/or said uplink wireless resource allocation information by receiving the broadcast messages of said base station. According to a further embodiment, said relay station 2 may acquire said downlink wireless resource allocation information and/or said uplink wireless resource allocation information by receiving a public control signaling sent by said base station. According to a further embodiment, said relay station 2 may acquire the downlink wireless resource allocation information between said base station and said relay station 1 and/or the uplink wireless resource allocation information between said relay station 1 and said base station by receiving the broadcast messages of said base station; and, said relay station 2 acquires the downlink wireless resource allocation information between said relay station 1 and said mobile station and/or the uplink wireless resource allocation information between said mobile station and said relay station 1 by receiving the public control signaling sent by said relay station 1. According to a further embodiment, when said relay station 2 confirms that, at this moment, the downlink transmission rate configuration of said mobile station is lower than a set threshold value 1 by said downlink wireless resource allocation information between said relay station 1 and said mobile station acquired by it, said relay station 2 may decide to aid the downlink relay of said relay station 1; and/or when said relay station 2 confirms that, at this moment, the uplink transmission rate configuration of said mobile station is lower than a set threshold value 2 by said uplink wireless resource allocation information between said mobile station and said relay station 1 acquired by it, said relay station 2 may decide to aid the uplink relay of said relay station 1. According to a further embodiment, said threshold value 1 and/or said threshold value 2 can be set by a system configuration, and can be dynamically adjusted according to the differences in time and geographical regions. According to a further embodiment, when said relay station 2 confirms that the number of times a downlink automatic retransmission is requested between said relay station 1 and said mobile station exceeds a set threshold 1, said relay station 2 may decide to aid the downlink relay of said relay station 1; and/or when said relay station 2 confirms that the number of times an uplink automatic retransmission is requested between said mobile station and said relay station 1 exceeds a set threshold 2, said relay station 2 may decide to aid the uplink relay of said relay station 1. According to a further embodiment, said threshold 1 and/or said threshold 2 may be set by the system configuration, and can be dynamically adjusted according to the differences in time and geographical regions. According to a further embodiment, when said relay station 2 decides to aid the downlink of said relay station 1, said relay station 2 judges whether it correctly receives the relay data sent by said base station to said relay station 1 and whether said relay station 1 correctly receives the relay data sent by said base station to it, and if both of them receive correctly, said relay station 2 may forward the relay data, sent by said base station to said relay station 1, to said mobile station; and/or when said relay station 2 decides to aid the uplink of said relay station 1, said relay station 2 judges whether it correctly receives the relay data sent by said mobile station to said relay station 1 and whether said relay station 1 correctly receives the relay data sent by said mobile station to said relay station 1, and if both of them receive correctly, said relay station 2 may forward the relay data, sent by said mobile station to said relay station 1, to said base station. According to a further embodiment, when said relay station 2 decides to aid the downlink relay of said relay station 1, said relay station 2 judges whether it correctly receives the relay data sent by said base station to said relay station 1, and if it receives correctly, said relay station 2 may forward the relay data, sent by said base station to said relay station 1, to said mobile station; and/or when said relay station 2 decides to aid the uplink relay of said relay station 1, said relay station 2 judges whether it correctly receives the relay data sent by said mobile station to said relay station 1, and if it receives rightly, said relay station 2 may forward the relay data, sent by said mobile station to said relay station 1, to said base station.

According to another embodiment, a multi-hop wireless communication system, may comprise abase station, a mobile station and a relay station 1, with said base station communicating with said mobile station via said relay station 1; and a relay station 2; said relay station 2 is used for acquiring the downlink wireless resource allocation information between said base station and said relay station 1 and between said relay station 1 and said mobile station, and/or the uplink wireless resource allocation information between said mobile station and said relay station 1 and between said relay station 1 and said base station; and when said relay station 2 decides to aid the downlink relay of said relay station 1, according to the downlink wireless resource allocation information acquired by it, said relay station 2 forwards the relay data, received by it and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by it, said relay station 2 forwards the relay data, received by it and sent by said mobile station to said relay station 1, to said base station by using the uplink wireless resource allocated between said relay station 1 and said base station.

According to yet another embodiment, in an aid relay station in a multi-hop wireless communication system, wherein said system comprises a base station, a mobile station and an ordinary relay station, and said base station communicates with said mobile station via said ordinary relay station; said aid relay station is used for acquiring the downlink wireless resource allocation information between said base station and said ordinary relay station and between said ordinary relay station and said mobile station, and/or the uplink wireless resource allocation information between said mobile station and said ordinary relay station and between said ordinary relay station and said base station; and when said aid relay station decides to aid the downlink relay of said ordinary relay station, according to the downlink wireless resource allocation information acquired by it, said aid relay station forwards the relay data, received by it and sent by said base station to said ordinary relay station, to said mobile station by using the downlink wireless resource allocated between said ordinary relay station and said mobile station; and/or when said aid relay station decides to aid the uplink relay of said ordinary relay station, according to the uplink wireless resource allocation information acquired by it, said aid relay station forwards the relay data, received by it and sent by said mobile station to said ordinary relay station, to said base station by using the uplink wireless resource allocated between said ordinary relay station and said base station.

According to a further embodiment of the aid relay station, said aid relay station may acquire the downlink wireless resource allocation information and/or said uplink wireless resource allocation information by receiving the broadcast messages of said base station. According to a further embodiment of the aid relay station, said aid relay station may acquire the downlink wireless resource allocation information between said base station and said ordinary relay station and/or uplink wireless resource allocation information between said ordinary relay station and said base station by receiving the broadcast messages of said base station; and said aid relay station acquires the downlink wireless resource allocation information between said ordinary relay station and said mobile station and/or uplink wireless resource allocation information between said mobile station and said ordinary relay station by receiving the public control signaling sent by said ordinary relay station. According to a further embodiment of the aid relay station, when said aid relay station confirms that at this moment, said downlink transmission rate configuration is lower than a set threshold value 1 by said downlink wireless resource allocation information between said ordinary relay station and said mobile station acquired by it, said aid relay station may decide to aid the downlink relay of said ordinary relay station; and/or when said aid relay station confirms that at this moment, the uplink transmission rate configuration is lower than a set threshold value 2 by the uplink wireless resource allocation information between said mobile station and said ordinary relay station acquired by it, said aid relay station may decide to aid the uplink relay of said ordinary relay station. According to a further embodiment of the aid relay station, when said aid relay station confirms that when the number of times the downlink automatic retransmission requested between said ordinary relay station and said mobile station is greater than a set threshold 1, said aid relay station may decide to aid the downlink relay of said ordinary relay station; and/or when said aid relay station confirms that the number of times the uplink automatic retransmission is requested between said mobile station and said ordinary relay station is greater than a set threshold 2, said aid relay station may decide to aid the uplink relay of said ordinary relay station. According to a further embodiment of the aid relay station, when said aid relay station decides to aid the downlink relay of said ordinary relay station, said aid relay station may judge whether it correctly receives the relay data sent by said base station to said ordinary relay station and whether said ordinary relay station correctly receives the relay data sent by said base station to it, and if both of them receive correctly, said aid relay station forwards the relay data, sent by said base station to said ordinary relay station, to said mobile station; and/or when said aid relay station decides to aid the uplink of said ordinary relay station, said aid relay station may judge whether it correctly receives the relay data sent by said mobile station to said ordinary relay station and whether said ordinary relay station correctly receives the relay data sent by said mobile station to it, and if both of them receive correctly, said aid relay station forwards the relay data, sent by said mobile station to said ordinary relay station, to said base station. According to a further embodiment of the aid relay station, when said aid relay station decides to aid the downlink relay of said ordinary relay station, said aid relay station judges whether it correctly receives the relay data sent by said base station to said ordinary relay station, and if it receives correctly, said aid relay station may forward the relay data, sent by said base station to said ordinary relay station, to said mobile station; and/or when said aid relay station decides to aid the uplink relay of said ordinary relay station, said aid relay station judges whether it correctly receives the relay data sent by said mobile station to said ordinary relay station, and if it receives correctly, said aid relay station may forward the relay data, sent by said mobile station to said ordinary relay station, to said base station. According to a further embodiment of the aid relay station, said aid relay station and said ordinary relay station can be located in the same cell. According to a further embodiment of the aid relay station, said aid relay station and said ordinary relay station can be located in different cells.

BRIEF DESCRIPTION OF THE DRAWINGS

The objects and features of the present invention will be further described in detail hereinbelow in conjunction with particular embodiments and accompanying drawings, and these particular embodiments are merely illustrative, and not limiting.

DETAILED DESCRIPTION

Figure 1:
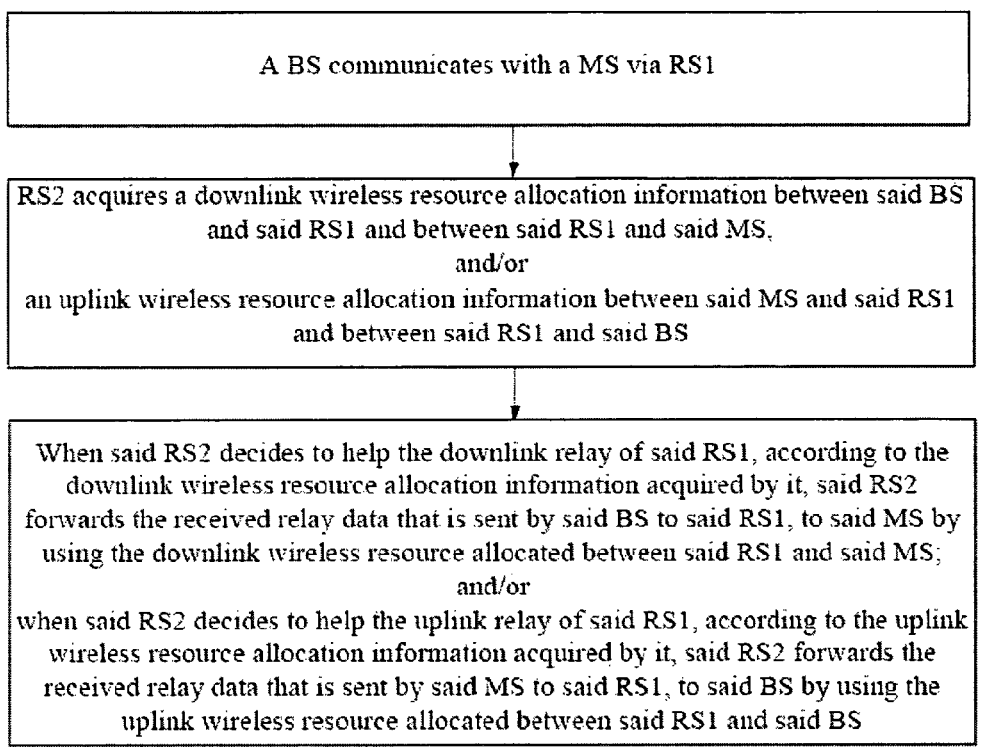
FIG. 1 is a flowchart of a method according to various embodiments.

According to various embodiments, in a relay method in a multi-hop wireless communication system, a base station communicates with a mobile station via a relay station 1; a relay station 2 acquires downlink wireless resource allocation information between said base station and said relay station 1 and between said relay station 1 and said mobile station, and/or uplink wireless resource allocation information between said mobile station and said relay station 1 and between said relay station 1 and said base station; when said relay station 2 decides to aid the downlink relay of said relay station 1, according to the downlink wireless resource allocation information acquired by it, said relay station 2 forwards the relay data, received by it and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by it, said relay station 2 forwards the received relay data, received by it and sent by said mobile station to said relay station 1, to said base station by using the uplink wireless resource allocated between said relay station 1 and said base station.

According to various embodiments, said relay station 2 acquires said downlink wireless resource allocation information and/or said uplink wireless resource allocation information by receiving the broadcast messages of said base station.

According to various embodiments, wherein said relay station 2 acquires said downlink wireless resource allocation information and/or said uplink wireless resource allocation information by receiving a public control signaling sent by said base station.

According to various embodiments, wherein said relay station 2 acquires the downlink wireless resource allocation information between said base station and said relay station 1 and/or the uplink wireless resource allocation information between said relay station 1 and said base station by receiving the broadcast messages of said base station; and said relay station 2 acquires the downlink wireless resource allocation information between said relay station 1 and said mobile station and/or the uplink wireless resource allocation information between said mobile station and said relay station 1 by receiving the public control signaling sent by said relay station 1.

According to various embodiments, wherein when said relay station 2 confirms that at this moment, the downlink transmission rate configuration of said mobile station is lower than a set threshold value 1 by said downlink wireless resource allocation information between said relay station 1 and said mobile station acquired by it, said relay station 2 decides to aid the downlink relay of said relay station 1; and/or when said relay station 2 confirms that, at this moment, the uplink transmission rate configuration of said mobile station is lower than a set threshold value 2 by said uplink wireless resource allocation information between said mobile station and said relay station 1 acquired by it, said relay station 2 decides to aid the uplink relay of said relay station 1.

According to various embodiments, wherein said threshold value 1 and/or said threshold value 2 are set by a system configuration, and can be dynamically adjusted according to the differences in time and geographical regions.

According to various embodiments, wherein when said relay station 2 confirms that the number of times the downlink automatic retransmission is requested between said relay station 1 and said mobile station exceeds a set threshold 1, said relay station 2 decides to aid the downlink relay of said relay station 1; and/or when said relay station 2 confirms that the number of times the uplink automatic retransmission requested between said mobile station and said relay station 1 exceeds a set threshold 2, said relay station 2 decides to aid the uplink relay of said relay station 1.

According to various embodiments, wherein said threshold 1 and/or said threshold 2 are set by the system configuration, and can be dynamically adjusted according to the differences in time and geographical regions.

According to various embodiments, wherein when said relay station 2 decides to aid the downlink of said relay station 1, said relay station 2 judges whether it correctly receives the relay data sent by said base station to said relay station 1 and whether said relay station 1 correctly receives the relay data sent by said base station to it, and if both of them receive correctly, said relay station 2 forwards the relay data, sent by said base station to said relay station 1, to said mobile station; and/or when said relay station 2 decides to aid the uplink of said relay station 1, said relay station 2 judges whether it correctly receives the relay data sent by said mobile station to said relay station 1 and whether said relay station 1 correctly receives the relay data sent by said mobile station to said relay station 1, and if both of them receive correctly, said relay station 2 forwards the relay data, sent by said mobile station to said relay station 1, to said base station.

According to various embodiments, wherein when said relay station 2 decides to aid the downlink relay of said relay station 1, said relay station 2 judges whether it correctly receives the relay data sent by said base station to said relay station 1, and if it receives correctly, then said relay station 2 forwards the relay data, sent by said base station to said relay station 1, to said mobile station; and/or when said relay station 2 decides to aid the uplink relay of said relay station 1, said relay station 2 judges whether it correctly receives the relay data sent by said mobile station to said relay station 1, and if it receives correctly, said relay station 2 forwards the relay data, sent by said mobile station to said relay station 1, to said base station.

A multi-hop wireless communication system comprising a base station, a mobile station, a relay station 1 and a relay station 2; said base station communicates with the mobile station via said relay station 1; said relay station 2 is used for acquiring the downlink wireless resource allocation information between said base station and said relay station 1 and between said relay station 1 and said mobile station, and/or the uplink wireless resource allocation information between said mobile station and said relay station 1 and between said relay station 1 and said base station; and when said relay station 2 decides to aid the downlink relay of said relay station 1, according to the downlink wireless resource allocation information acquired by it, said relay station 2 forwards the relay data, received by it and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by it, said relay station 2 forwards the relay data received by it and sent by said mobile station to said relay station 1, to said base station by using the uplink wireless resource allocated between said relay station 1 and said base station.

An aid relay station in a multi-hop wireless communication system, wherein said system comprises a base station, a mobile station, and an ordinary relay station, with said base station communicating with said mobile station via said ordinary relay station; said aid relay station is used for acquiring the downlink wireless resource allocation information between said base station and said ordinary relay station and between said ordinary relay station and said mobile station, and/or the uplink wireless resource allocation information between said mobile station and said ordinary relay station and between said ordinary relay station and said base station; and when said aid relay station decides to aid the downlink relay of said ordinary relay station, according to the downlink wireless resource allocation information acquired by it, said aid relay station forwards the relay data, received by it and sent by said base station to said ordinary relay station, to said mobile station by using the downlink wireless resource allocated between said ordinary relay station and said mobile station; and/or when said aid relay station decides to aid the uplink relay of said ordinary relay station, according to the uplink wireless resource allocation information acquired by it, said aid relay station forwards the relay data, received by it and sent by said mobile station to said ordinary relay station, to said base station by using the uplink wireless resource allocated between said ordinary relay station and said base station.

By way of the technical concept of an aid relay station according to various embodiments, the aid relay station can decide by itself whether to provide the aid to a relay station which relays the communication between a base station and a mobile station, and the aid relay station can be invisible to the base station and the mobile station, and therefore, when implemented, the extra signaling overheads will not be generated in the multi-hop wireless communication system; at the same time, when the relay quality of an aided relay station is poor, it can be improved effectively with the aid of the aid relay station, thereby improving the system performance of the multi-hop wireless communication system.

In order to reduce the signaling overheads for managing the relay stations in a multi-hop wireless communication system, so that when the number of relay stations increases, the signaling overheads occurred thereby in the multi-hop wireless communication system will not increase excessively, leading to negative effects on the performance of the system, the concept of an aid relay station is proposed in various embodiments. The aid relay station according to various embodiments is not a relay station which is originally deployed in the multi-hop wireless communication system and used for relaying the communication between a base station and a mobile station, instead the aid relay station can decide by itself whether to provide aid for a relay station which relays the communication between a base station and a mobile station, and the aid relay station can be invisible to the base station and the mobile station, namely, the aid relay station will not generate any signaling between itself and the base station or the mobile station, and therefore, the aid relay station, when being implemented, will not generate extra signaling overheads in the multi-hop wireless communication system; and, at the same time, when the relay quality of an aided relay station is poor, it can be improved effectively with the aid of the aid relay station, thereby improving the system performance of the multi-hop wireless communication system.

Based on the above technical concept according to various embodiments, as shown in FIG. 1, the relay method in the multi-hop wireless communication system proposed by various embodiments comprises the following steps: a base station communicates with a mobile station via a relay station 1; a relay station 2 acquires downlink wireless resource allocation information between said base station and said relay station 1 and between said relay station and said mobile station, and/or uplink wireless resource allocation information between said mobile station and said relay station 1 and between said relay station 1 and said base station; when said relay station 2 decides to aid the downlink relay of said relay station 1, according to the downlink wireless resource allocation information acquired by it, said relay station 2 forwards the relay data, received by it and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by it, said relay station 2 forwards the relay data, received by it and sent by said mobile station to said relay station 1, to said base station by using the uplink wireless resource allocated between said relay station 1 and said base station.

In order to distinguish from the aid relay station according to various embodiments, in this patent application, a relay station, which is originally deployed in the multi-hop wireless communication system and used for relaying the communication between a base station and mobile stations, is referred to as an ordinary relay station. That is to say, in the method according to various embodiments, the relay station 1 is an ordinary relay station and the relay station 2 is an aid relay station.

The method according to various embodiments can be implemented very easily in a multi-hop wireless communication system adopting centralized management of the ordinary relay stations. In such a system, both of the communication links between a base station and an ordinary relay station and between the ordinary relay station and a mobile station need to be managed by the base station, and the base station will allocate the wireless resources to the communication link between it and the ordinary relay station and the communication link between the ordinary relay station and the mobile station, and broadcast the wireless resource information. In this way, according to various embodiments, said relay station 2 can acquire the downlink wireless resource allocation information between said base station and said relay station 1 and between said relay station 1 and said mobile station, and/or the uplink wireless resource allocation information between said mobile station and said relay station 1 and between said relay station 1 and said mobile station, by receiving the broadcast messages of said base station.

In the multi-hop wireless communication system adopting centralized management of the ordinary relay stations, the base station can also transmit the wireless resource allocation information by public control signaling. In this way, according to various embodiments, said relay station 2 can also acquire the downlink wireless resource allocation information and/or the uplink wireless resource allocation information by receiving the public control signaling sent by said base station.

According to various embodiments, the method can also be implemented very easily in a multi-hop wireless communication system adopting the concept of a distributed network. In such a system, a base station only manages the communication link between itself and an ordinary relay station, while the communication link between the ordinary relay station and a mobile station is managed by the ordinary relay station itself; in this case, the ordinary relay station is a relay station similar to a base station, and the ordinary relay station can allocate the wireless resource to the link between itself and the mobile station like a base station, and transmit the wireless resource allocation information by the public control signaling or broadcast messages. In this way, according to various embodiments, said relay station 2 can acquire the downlink wireless resource allocation information between said base station and said relay station 1 and/or the uplink wireless resource allocation information between said relay station 1 and said base station by receiving the broadcast messages of said base station; or, it can acquire the downlink wireless resource allocation information between said base station and said relay station 1 and/or the uplink wireless resource allocation information between said relay station 1 and said base station by receiving the public control signaling sent by said base station. At the same time, said relay station 2 can acquire the downlink wireless resource allocation information between said relay station 1 and said mobile station and/or the uplink wireless resource allocation information between said mobile station and said relay station 1 by receiving the broadcast messages of said relay station 1; or, it can acquire the downlink wireless resource allocation information between said relay station 1 and said mobile station and/or the uplink wireless resource allocation information between said mobile station and said relay station 1 by receiving the public control signaling sent by said relay station 1.

The aid relay station according to various embodiments, when judging whether to provide the aid, can decide whether to provide the aid to the ordinary relay stations, which ordinary relay stations should be provided with the aid, and whether the downlink relay or the uplink relay of ordinary relay stations is to be provided with the aid, according to its own processing capability and the quality of the links. Preferably, the parameters can be set by the system configuration, and then, the aid relay station according to various embodiments can decide whether to provide the aid according to said parameters. For example, in implementing the method according to various embodiments, when said relay station 2 confirms that at this moment, said downlink transmission rate configuration is lower than a set threshold value 1 by the downlink wireless resource allocation information between said relay station 1 and said mobile station acquired by itself, said relay station 2 decides to aid the downlink relay of said relay station 1; and/or when said relay station 2 confirms that, at this moment, said uplink transmission rate configuration of said mobile station is lower than a set threshold value 2 by said uplink wireless resource allocation information between said mobile station and said relay station 1 acquired by itself, said relay station 2 decides to aid the uplink relay of said relay station 1. As another example, when said relay station 2 confirms that the number of times of the downlink automatic retransmission request between said relay station 1 and said mobile station exceeds a set threshold 1, said relay station 2 decides to aid the downlink relay of said relay station 1; and/or when said relay station 2 confirms that the number of times the uplink automatic retransmission is requested between said mobile station and said relay station 1 exceeds a set threshold 2, said relay station 2 decides to aid the uplink relay of said relay station 1.

In a wireless communication system, the communication traffic distribution often changes with time and location. For example, the communication traffic in some peak periods such as holidays is greater than that in normal times, and the communication traffic in some districts, such as central business districts, airports and stadiums, is greater than that in other districts. Thus, in a multi-hop wireless communication system, the processing capability of an ordinary relay station required at different times may fluctuate, thus causing the processing capability of the ordinary relay station to be insufficient in busy hours while surplus in idle hours. Alternatively, in different districts of a multi-hop wireless communication system, the processing capability required by different ordinary relay stations may be different, thereby causing the processing capability of one ordinary relay station to be insufficient while that of another one surplus. Therefore, when said parameters are set by the system configuration according to the communication traffic distribution in the multi-hop wireless communication system, it can make the setting of said parameters match with it, and said parameters can be dynamically adjusted according to the changes in the communication traffic at different times and in different districts. Thus, with the aid of the aid relay station according to various embodiments, the link adaptation can be realized in a better way, thereby further improving the performance of the multi-hop wireless communication system, without generating extra signaling overheads in the multi-hop wireless communication system.

The method according to various embodiments will be described in detail hereinbelow in conjunction with three particular embodiments. In embodiment one, said relay station 2 aids the downlink relay of said relay station 1, and the steps thereof are as follows:

Step 101: said relay station 2 acquires the downlink wireless resource allocation information between said base station and said relay station 1 and between said relay station 1 and said mobile station by receiving the broadcast messages of said base station;

Step 102: when said relay station 2 confirms that the number of times the downlink automatic retransmission requested between said relay station 1 and said mobile station exceeds the set threshold 1, said relay station 2 decides to aid the downlink relay of said relay station 1; wherein, said threshold 1 is set by the system configuration;

Step 103: said relay station 2, according to the downlink wireless resource allocation information between said base station and said relay station 1 acquired by itself, receives the relay data sent by said base station to said relay station 1;

Step 104: said relay station 2 judges whether it correctly receives the relay data sent by said base station to said relay station 1 and whether said relay station 1 correctly receives the relay data sent by said base station to it; wherein, whether said relay station 1 correctly receives the relay data sent by said base station to it can be judged by the information "acknowledge (ACK)" or "not acknowledge (NACK)" sent by said relay station 1 to said base station; and Step 105: if both of them receive correctly, said relay station 2 forwards the relay data received by itself and sent by said base station to said relay station 1, to said mobile station by using the downlink wireless resource allocated between said relay station 1 and said mobile station; otherwise, said relay station 2 discards said relay data received by it.

In embodiment two, said relay station 2 aids the uplink relay of said relay station 1, and the steps thereof are as follows:

Step 201: said relay station 2 acquires the uplink wireless resource allocation information between said mobile station and said relay station 1 and between said relay station 1 and said base station by receiving the broadcast messages of said base station;

Step 202: when said relay station 2 confirms that the number of times there is an uplink ARQ between said mobile station and said relay station 1 exceeds the set threshold 2, said relay station 2 decides to aid the uplink relay of said relay station 1; wherein, said threshold 2 is set by the system configuration;

Step 203: said relay station 2, according to the uplink wireless resource allocation information between said mobile station and said relay station 1 acquired by itself, receives the relay data sent by said mobile station to said relay station 1;

Step 204: said relay station 2 judges whether it correctly receives the relay data sent by said mobile station to said relay station 1, and whether said relay station 1 correctly receives the relay data sent by said mobile station to it; wherein, whether said relay station 1 correctly receives the relay data sent by said mobile station to it can be judged by the information "acknowledge (ACK)" or "not acknowledge (NACK)" sent by said relay station 1 to said mobile station; and Step 205: if both of them receive correctly, said relay station 2 forwards the relay data, received by itself and sent by said mobile station to said relay station 1, to said base station by using the uplink wireless resource allocated between said relay station 1 and said base station; otherwise, said relay station 2 discards said relay data received by it.

In embodiment three, said relay station 2 aids the downlink relay and the uplink relay of said relay station 1, and the steps thereof are as follows:

Step 301: said relay station 2 acquires the downlink wireless resource allocation information between said base station and said relay station 1 and between said relay station 1 and said mobile station, and the uplink wireless resource allocation information between said mobile station and said relay station 1 and between said relay station 1 and said base station, by receiving the broadcast messages of said base station;

Step 302: when said relay station 2 confirms that, at this moment, the downlink transmission rate configuration of said mobile station is lower than a set threshold value 1 by the downlink wireless resource allocation information between said relay station 1 and said mobile station acquired by itself, said relay station 2 decides to aid the downlink relay of said relay station 1; when said relay station 2 confirms that, at this moment, the uplink transmission rate configuration of said mobile station is lower than a set threshold value 2 by the uplink wireless resource allocation information between said mobile station and said relay station 1 acquired by itself, said relay station 2 decides to aid the uplink relay of said relay station 1; wherein, said threshold value 1 and threshold value 2 are set by the system configuration;

Step 303: said relay station 2, according to the downlink wireless resource allocation information between said base station and said relay station 1 acquired by itself, receives the relay data sent by said base station to said relay station 1, and according to the uplink wireless resource allocation information between said mobile station and said relay station 1 acquired by itself, receives the relay data sent by said mobile station to said relay station 1;

Step 304: said relay station 2 judges whether it correctly receives the relay data sent by said base station to said relay station 1 and the relay data sent by said mobile station to said relay station 1; and Step 305: if said relay station 2 correctly receives the relay data sent by said base station to said relay station 1, it forwards the relay data, sent by said base station to said relay station 1, to said mobile station by using the downlink wireless resource allocated between said relay station 1 and said mobile station, otherwise, said relay station 2 discards the said relay data received by itself and sent by said base station to said relay station 1; if said relay station 2 correctly receives the relay data sent by said mobile station to said relay station 1, it forwards the relay data, received by itself and sent by said mobile station to said relay station 1, to said base station by using the uplink wireless resource allocated between said relay station 1 and said base station, otherwise, said relay station 2 discards the received relay data received by itself and sent by said mobile station to said relay station 1.

In the above three particular embodiments, before said relay station 2 forwards the relay data, received by itself and sent to said relay station 1, to said base station and/or said mobile station, it further judges whether it receives said relay data correctly, and forwards the relay data to said base station and/or said mobile station only when it receives correctly, such that this can further improve the relay quality of said relay station 2, thereby making the aid of said relay station 2 to said relay station 1 more effective.

Figure 2:
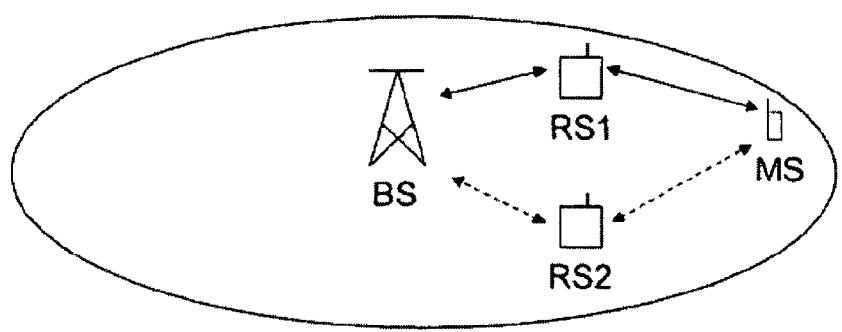
FIG. 2 is a schematic structural diagram of a system according to various embodiments.

The method according to various embodiments is described in detail above. Based on the technical concept according to various embodiments, there is further proposes a multi-hop wireless communication system and an aid relay station, for implementing the method. A schematic structural diagram of a system according to various embodiments is shown in FIG. 2, wherein it comprises a base station, a mobile station, a relay station 1 and a relay station 2. Said base station communicates with said mobile station via said relay station 1, namely, said relay station 1 is an ordinary relay station. Said relay station 2 is an aid relay station according to various embodiments and is used for acquiring the downlink wireless resource allocation information between said base station and said relay station 1 and between said relay station 1 and said mobile station, and/or the uplink wireless resource allocation information between said mobile station and said relay station 1 and between said relay station 1 and said base station; and, when said relay station 2 decides to aid the downlink relay of said relay station 1, according to the downlink wireless resource allocation information acquired by itself, said relay station 2 forwards the relay data, received by itself and sent by said base station to said relay station 1, to said mobile station by using the downlink wireless resource allocated between said relay station 1 and said mobile station; and/or when said relay station 2 decides to aid the uplink relay of said relay station 1, according to the uplink wireless resource allocation information acquired by itself, said relay station 2 forwards the relay data, received by itself and sent by said mobile station to said relay station 1, to said base station by using the uplink wireless resource allocated between said relay station 1 and said base station.

A detailed description and particular embodiments of the multi-hop wireless communication system and the aid relay station can be found in the related content in the above description of the method, and will not be described here redundantly.

Furthermore, based on the technical concept of various embodiments, it should be understood by those skilled in the art that the present invention is not limited to a "two-hop" link such as "a base station—an ordinary relay station—a mobile station" when being implemented, and is also not limited to the case where an aid relay station and an ordinary relay station are in the same cell; instead, in terms of the aid relay station, as long as the downlink wireless resource allocation information between an ordinary relay station and its previous hop and between the ordinary relay station and its next hop and/or the uplink wireless resource allocation information between the ordinary relay station and its previous hop and between the ordinary relay station and its next hop can be acquired by an aid relay station, and the relay data to be forwarded by the ordinary relay station to its previous hop or next hop can be received by the aid relay station, the aid relay station can decide by itself whether to aid the uplink relay and/or downlink relay of the ordinary relay station.

The series of detailed descriptions set forth above is merely a specific description targeting the possible embodiments, and is not intended to limit the protective scope of the present invention, and any equivalent embodiment or alternative, without departing from the technical spirit of the present invention, should be covered in the protective scope of the present invention.

What is claimed is:

1. A relay method in a wireless communication system including a base station, a mobile station, a first relay station, and a second relay station, the method comprising:
    (a) said second relay station acquiring a downlink wireless resource allocation information between said base station and said first relay station and between said first relay station and said mobile station;
        said second relay station determining to aid the downlink relay of said first relay station in response to determining at least one of:
            a downlink transmission rate configuration of said mobile station is currently lower than a first threshold transmission rate value specified by said downlink wireless resource allocation information between said first relay station and said mobile station; and
            a number of downlink automatic retransmission requests between said first relay station and said mobile station exceeds a first retransmission threshold value; and
        in response to determining to aid the downlink relay of said first relay station, said second relay station using said acquired downlink wireless resource allocation information to (i) receive relay data sent from said base station to said first relay station, and (ii) forward said relay data to said mobile station; and
    (b) said second relay station acquiring an uplink wireless resource allocation information between said mobile station and said first relay station and between said relay station and said base station;
        said second relay station determining to aid the uplink relay of said first relay station in response to determining at least one of:
            an uplink transmission rate configuration of said mobile station is currently lower than a second threshold transmission rate value specified by said uplink wireless resource allocation information between said mobile station and said first relay station; and
            a number of uplink automatic retransmission requests between said mobile station and said first relay station exceeds a second retransmission threshold value; and
        in response to determining to aid the uplink relay of said first relay station, said second relay station using said acquired uplink wireless resource allocation information to (i) receive relay data sent from said mobile station to said first relay station, and (ii) forward said relay data to said base station.

2. The method according to claim 1, wherein said second relay station acquires at least one of said downlink wireless resource allocation information and said uplink wireless resource allocation information by receiving broadcast messages of said base station.

3. The method according to claim 1, wherein said second relay station acquires at least one of said downlink wireless resource allocation information and said uplink wireless resource allocation information by receiving a public control signaling sent by said base station.

4. The method according to claim 1, wherein said second relay station acquires at least one of the downlink wireless resource allocation information between said base station and said relay station and the uplink wireless resource allocation information between said relay station and said base station by receiving broadcast messages of said base station; and said second relay station acquires at least one of the downlink wireless resource allocation information between said first relay station and said mobile station and the uplink wireless resource allocation information between said mobile station and said first relay station by receiving the public control signaling sent by said first relay station.

5. The method according to claim 1, wherein at least one of said first threshold value and said second threshold value are set by a system configuration, and can be dynamically adjusted according to differences in time and geographical regions.

6. The method according to claim 1, wherein at least one of said first threshold value and said second threshold value are set by a system configuration, and can be dynamically adjusted according to differences in time and geographical regions.

7. A relay method in a wireless communication system including a base station, a mobile station, a first relay station, and a second relay station, the method comprising:
at least one of:
(a) said second relay station acquiring a downlink wireless resource allocation information between said base station and said first relay station and between said first relay station and said mobile station;
said second relay station using said acquired downlink wireless resource allocation information to receive relay data sent by said base station to said first relay station;
said second relay station determining whether it has correctly received the relay data sent by said base station; and
said second relay station forwarding said relay data to said mobile station only if said second relay station determines that it has correctly received the relay data sent by said base station; and
(b) said second relay station acquiring an uplink wireless resource allocation information between said mobile station and said first relay station and between said first relay station and said base station;
said second relay station using said acquired uplink wireless resource allocation information to receive relay data sent by said mobile station to said first relay station;
said second relay station determining whether it has correctly received the relay data sent by said mobile station; and
said second relay station forwarding said relay data to said base station only if said second relay station determines that it has correctly received the relay data sent by said mobile station.

8. The method according to claim 7, comprising at least one of:
said second relay station forwarding said relay data to said mobile station only if said second relay station determines that both (a) it has correctly received the relay data sent by said base station, and (b) said first relay station has correctly received the relay data sent by said base station; and
said second relay station forwarding said relay data to said base station only if said second relay station determines that both (a) it has correctly received the relay data sent by said mobile station, and (b) said first relay station has correctly received the relay data sent by said mobile station.

9. A communication system, comprising:
a base station,
a mobile station; and
a first relay station; and
a second relay station;
wherein said base station is configured to communicate with said mobile station via said first relay station; and
wherein said second relay station is programmed to:
(a) acquire a downlink wireless resource allocation information between said base station and said first relay station and between said first relay station and said mobile station;
determine to aid the downlink relay of said first relay station in response to determining at least one of:
a downlink transmission rate configuration of said mobile station is currently lower than a first threshold transmission rate value specified by said downlink wireless resource allocation information between said first relay station and said mobile station; and
a number of downlink automatic retransmission requests between said first relay station and said mobile station exceeds a first retransmission threshold value; and
in response to determining to aid the downlink relay of said first relay station, use said acquired downlink wireless resource allocation information to (i) receive relay data sent from said base station to said first relay station, and (ii) forward said relay data to said mobile station; and
(b) acquire an uplink wireless resource allocation information between said mobile station and said first relay station and between said relay station and said base station;
determine to aid the uplink relay of said first relay station in response to determining at least one of:
an uplink transmission rate configuration of said mobile station is currently lower than a second threshold transmission rate value specified by said uplink wireless resource allocation information between said mobile station and said first relay station; and
a number of uplink automatic retransmission requests between said mobile station and said first relay station exceeds a second retransmission threshold value; and
in response to determining to aid the uplink relay of said first relay station, use said acquired uplink wireless resource allocation information to (i) receive relay data sent from said mobile station to said first relay station, and (ii) forward said relay data to said base station.

10. A communication system, comprising:
a base station,
a mobile station; and
a first relay station; and
a second relay station;
wherein said base station is configured to communicate with said mobile station via said first relay station; and
wherein said second relay station is programmed to at least one of:
(a) acquire a downlink wireless resource allocation information between said base station and said first relay station and between said first relay station and said mobile station;

use said acquired downlink wireless resource allocation information to receive relay data sent by said base station to said first relay station;
determine whether it has correctly received the relay data sent by said base station; and
forward said relay data to said mobile station only if said second relay station determines that it has correctly received the relay data sent by said base station; and
(b) acquire an uplink wireless resource allocation information between said mobile station and said first relay station and between said first relay station and said base station;
use said acquired uplink wireless resource allocation information to receive relay data sent by said mobile station to said first relay station;
determine whether it has correctly received the relay data sent by said mobile station; and
forward said relay data to said base station only if said second relay station determines that it has correctly received the relay data sent by said mobile station.

11. The communication system according to claim 10, wherein said second relay station is programmed to at least one of:
forward said relay data to said mobile station only if said second relay station determines that both (a) it has correctly received the relay data sent by said base station, and (b) said first relay station has correctly received the relay data sent by said base station; and
forward said relay data to said base station only if said second relay station determines that both (a) it has correctly received the relay data sent by said mobile station, and (b) said first relay station has correctly received the relay data sent by said mobile station.

12. An aid relay station in a wireless communication system comprising a base station, a mobile station; and an ordinary relay station,
wherein said aid relay station is programmed to:
(a) acquire a downlink wireless resource allocation information between said base station and said ordinary relay station and between said ordinary relay station and said mobile station;
determine to aid the downlink relay of said ordinary relay station in response to determining at least one of:
a downlink transmission rate configuration of said mobile station is currently lower than a first threshold transmission rate value specified by said downlink wireless resource allocation information between said ordinary relay station and said mobile station; and
a number of downlink automatic retransmission requests between said ordinary relay station and said mobile station exceeds a first retransmission threshold value; and
in response to determining to aid the downlink relay of said ordinary relay station, use said acquired downlink wireless resource allocation information to (i) receive relay data sent from said base station to said ordinary relay station, and (ii) forward said relay data to said mobile station; and
(b) acquire an uplink wireless resource allocation information between said mobile station and said ordinary relay station and between said relay station and said base station;
determine to aid the uplink relay of said ordinary relay station in response to determining at least one of:
an uplink transmission rate configuration of said mobile station is currently lower than a second threshold transmission rate value specified by said uplink wireless resource allocation information between said mobile station and said ordinary relay station; and
a number of uplink automatic retransmission requests between said mobile station and said ordinary relay station exceeds a second retransmission threshold value; and
in response to determining to aid the uplink relay of said ordinary relay station, use said acquired uplink wireless resource allocation information to (i) receive relay data sent from said mobile station to said ordinary relay station, and (ii) forward said relay data to said base station.

13. The aid relay station according to claim 12, wherein said aid relay station acquires at least one of the downlink wireless resource allocation information and said uplink wireless resource allocation information by receiving broadcast messages of said base station.

14. The aid relay station according to claim 12, wherein:
said aid relay station is programmed to acquire at least one of the downlink wireless resource allocation information between said base station and said ordinary relay station and uplink wireless resource allocation information between said ordinary relay station and said base station by receiving broadcast messages of said base station; and
said aid relay station is programmed to acquire at least one of the downlink wireless resource allocation information between said ordinary relay station and said mobile station and uplink wireless resource allocation information between said mobile station and said ordinary relay station by receiving the public control signaling sent by said ordinary relay station.

15. The aid relay station according to claim 12, wherein said aid relay station and said ordinary relay station are located in the same cell.

16. The aid relay station according to claim 12, wherein said aid relay station and said ordinary relay station are located in different cells.

17. An aid relay station in a wireless communication system comprising a base station, a mobile station; and an ordinary relay station,
wherein said aid relay station is programmed to at least one of:
(a) acquire a downlink wireless resource allocation information between said base station and said ordinary relay station and between said ordinary relay station and said mobile station;
use said acquired downlink wireless resource allocation information to receive relay data sent by said base station to said ordinary relay station;
determine whether it has correctly received the relay data sent by said base station; and
forward said relay data to said mobile station only if said aid relay station determines that it has correctly received the relay data sent by said base station; and
(b) acquire an uplink wireless resource allocation information between said mobile station and said ordinary relay station and between said ordinary relay station and said base station;
use said acquired uplink wireless resource allocation information to receive relay data sent by said mobile station to said ordinary relay station;

determine whether it has correctly received the relay data sent by said mobile station; and forward said relay data to said base station only if said aid relay station determines that it has correctly received the relay data sent by said mobile station.

18. The aid relay station according to claim 17, wherein said aid relay station is programmed to at least one of:

forward said relay data to said mobile station only if said aid relay station determines that both (a) it has correctly received the relay data sent by said base station, and (b) said ordinary relay station has correctly received the relay data sent by said base station; and forward said relay data to said base station only if said aid relay station determines that both (a) it has correctly received the relay data sent by said mobile station, and (b) said ordinary relay station has correctly received the relay data sent by said mobile station.

* * * * *